US008488894B2

(12) United States Patent
Cheng

(10) Patent No.: US 8,488,894 B2
(45) Date of Patent: Jul. 16, 2013

(54) METHOD AND SYSTEM FOR DOT-MATRIX FONT DATA COMPRESSION AND DECOMPRESSION

(75) Inventor: Kuo-Young Cheng, Taichung Hsien (TW)

(73) Assignee: DynaComware Taiwan Inc., Taipei (TW)

( * ) Notice: Subject to any disclaimer, the term of this patent is extended or adjusted under 35 U.S.C. 154(b) by 428 days.

(21) Appl. No.: 12/945,528

(22) Filed: Nov. 12, 2010

(65) Prior Publication Data
US 2012/0121180 A1    May 17, 2012

(51) Int. Cl.
*G06K 9/36* (2006.01)
(52) U.S. Cl.
USPC .......................................................... 382/246
(58) Field of Classification Search
USPC .................................................. 382/232–253
See application file for complete search history.

(56) References Cited

U.S. PATENT DOCUMENTS

| | | | |
|---|---|---|---|
| 5,959,675 A * | 9/1999 | Mita et al. ................. | 375/240.04 |
| 6,081,551 A * | 6/2000 | Etoh ............................ | 375/240 |
| 6,785,424 B1 * | 8/2004 | Sakamoto ..................... | 382/244 |
| 6,842,540 B1 * | 1/2005 | Okayama et al. ............. | 382/246 |
| 6,904,176 B1 * | 6/2005 | Chui et al. .................... | 382/240 |
| 7,064,489 B2 | 6/2006 | Price | |
| 7,362,245 B2 | 4/2008 | Kuo et al. | |
| 7,720,878 B2 | 5/2010 | Caldwell et al. | |
| 7,737,869 B2 | 6/2010 | Monro | |
| 7,737,870 B1 | 6/2010 | Wang | |
| 2005/0036653 A1 * | 2/2005 | Brundage et al. ............. | 382/100 |

FOREIGN PATENT DOCUMENTS

JP        2012213088 A    * 11/2012

* cited by examiner

*Primary Examiner* — Jingge Wu
(74) *Attorney, Agent, or Firm* — Seed IP Law Group PLLC

(57) ABSTRACT

A method and system are provided for compressing and/or decompressing a set of dot-matrix font characters. According to a compression method, each dot-matrix font character is divided into a horizontal image including horizontal (stroke) image pattern(s), a vertical image including vertical (stroke) image pattern(s), and a residual image including residual image pattern(s) obtained by removing the horizontal and vertical images from the original character. Then, the Huffman coding is applied to each of a set of the horizontal image patterns, a set of the vertical image patterns, and a set of the residual image patterns, respectively, to produce compressed horizontal codes for the horizontal image patterns in a horizontal Huffman table, compressed vertical codes for the vertical image patterns in a vertical Huffman table, and compressed residual codes for the residual image patterns in a residual Huffman table. The compressed horizontal, vertical, and residual codes are selectively combined into a bit string that represents a compressed form of each character.

20 Claims, 12 Drawing Sheets

| Read-out from Horizontal Huffman Table 71 ||
|---|---|
| Compressed Code | Image Pattern |
| 001010 | 0111111111111110 |
| 110100 | 0001111111110000 |
| 11010110 | 0001111000000000 |
| 11010110 | 0001111000000000 |
| 11010110 | 0001111000000000 |
| 000010 | 0111111111111100 |

| Read-out from Vertical Huffman Table 73 ||
|---|---|
| Compressed Code | Image Pattern |
| 0101 | 1111111111111110 |
| 1011011 | 0111111100000000 |
| 0101 | 1111111111111110 |

| Read-out from Residual Huffman Table 75 ||
|---|---|
| Compressed Code | Image Pattern |
| 00 | 0000000000000000 |
| 00 | 0000000000000000 |
| 10101 | 0000000000100000 |
| 111100 | 0000000000010000 |
| 00 | 0000000000000000 |
| 00 | 0000000000000000 |
| 11111 | 0000000000110000 |
| 010010 | 0001001000100000 |
| 10110 | 0000000001000000 |
| 110001 | 0000000001010000 |
| 110011 | 0000000010110000 |
| 011011 | 0000000100010000 |
| 00 | 0000000000000000 |
| 00 | 0000000000000000 |
| 00 | 0000000000000000 |
| 00 | 0000000000000000 |

*FIG. 7C*

METHOD AND SYSTEM FOR DOT-MATRIX FONT DATA COMPRESSION AND DECOMPRESSION

BACKGROUND

1. Technical Field

The present invention is directed to data compression and decompression, and more particularly to a method and system for dot-matrix font data compression and decompression.

2. Description of the Related Art

A method for compressing dot-matrix font data should be lossless, i.e., the compression result must be such that it can be decompressed back to the original dot-matrix font image. Some lossless font data compression techniques employ the entropy coding approach. According to the theory of entropy coding, in a set of "n" number of multiple image patterns (1~n), an image pattern that occurs more often is assigned a shorter bit-length code while an image pattern that occurs less often is assigned a longer bit-length code. Thus, the average bit-length of codes assigned to multiple image patterns in the set is:

$$A = \sum_{i=1}^{n} l_i P_i \quad \text{(Eq. 1)}$$

where l is the code bit-length and P is the probability of an image pattern occurring in the set, such that $l_i$ means the code bit-length of the ith image pattern and $P_i$ means the probability of the ith image pattern, where $$\sum_{i=1}^{n} P_i = 1. \quad \text{(Eq. 2)}$$

In dot-matrix font data, each character is defined as a collection of (activated) dots in a matrix. For example, a Chinese character may be defined as a collection of dots, in a 16×16 matrix for example, as shown in FIG. 1A. FIG. 1A shows one character 20 in a 16×16 matrix, including an upper straight portion 20a and a lower bifurcated portion 20b. Typically, an Asian font is composed of a large number of characters. For example, the Ming-style Chinese font includes 13,108 characters. For the purpose of applying the entropy coding approach to compressing dot-matrix Asian font data, treating each Asian character as an image pattern may be impractical due to the sheer volume of characters in each set. Thus, it is possible to divide each dot-matrix character into multiple rows (or columns) of the matrix and to treat each row (or column) as an image pattern. For example, in FIG. 1A, the 16×16 matrix can be divided into sixteen rows 1-16, wherein each row includes sixteen pixels. In the illustrated example, the first row (row 1) has $7^{th}$ and $8^{th}$ pixels activated, and thus forms an image pattern that can be expressed as: 0000001100000000, where 1 represents an activated pixel and 0 represents a non-activated pixel. The second through sixteenth rows can be expressed in the same manner, and each character can be expressed as a collection of sixteen image patterns.

Two image patterns with different number and/or distribution of activated pixels (dots) constitute two different image patterns. Thus, in the example of the 16×16 matrix, each character may consist of 1 to 16 image patterns. For example, a character may consist of one image pattern that appears repeatedly through multiple rows, as in the upper straight portion 20a of the character 20 in FIG. 1A. In the following, the phrase "image patterns" means different image patterns, unless specifically characterized as the same image pattern that appears multiple times.

Consider a case wherein a set includes "m" number of 16×16 dot-matrix characters, wherein the set also includes "n" number of image patterns. Assume further that all sixteen image patterns in each character are different from each other, i.e., n=m×16. In this extreme case, the probability of each of the image patterns occurring in the set is the same for each image pattern, i.e., every dot-matrix character in the set is considered randomly generated. Of course, in this extreme case, no compression is possible because the set of compressed characters would require the same amount of bit space as that of the original dot-matrix font data, i.e., the bit space of 16×16×m. However, this extreme case does not happen in reality because dot-matrix font data are not randomly generated. Rather, dot-matrix font data are constructed according to order such that, for example, some image patterns that constitute basic components (radicals) of Asian characters occur more often than other image patterns. Thus, typically, the occurrences of dot-matrix font image patterns in a character set (some occurring more often than others) can be represented statistically as a normal (or Gaussian) distribution function.

Theoretically, a set of dot-matrix font characters sized 2k×2k matrix (k: positive integer) can be compressed such that the average bit-length of codes that are assigned to multiple image patterns in the set is shorter than 2k, i.e., 2k×g where g<1. The compression ratio is defined as 1: g, i.e., the ratio of 1 byte of the original storage requirement relative to g bytes of the storage requirement after compression.

Usually, the entropy encoding is implemented as the Huffman coding method known in the art, which includes the steps of: (1) calculating the probability of occurrence of each image pattern in a set; (2) sorting the order of image patterns according to their occurrence probability from high to low; (3) from low to high, sequentially merging two adjacent image patterns into nodes and repeating step (2) until all image patterns are merged to a single node, or the root, of a leveled tree, i.e., until a Huffman tree is constructed; (4) tracing paths of the tree from the root to leaves while assigning shorter bit-length codes to the image patterns with higher occurrence probability and assigning longer bit-length codes to the image patterns with lower occurrence probability; and (5) generating a Huffman table that records the compressed codes (the generated codes having a shorter or longer bit-length) and the corresponding image patterns that the codes represent. The average bit-length of codes generated by the Huffman coding method is close to that of the entropy coding.

However, the effectiveness of lossless font data compression using the Huffman coding method depends heavily on the size of the tree—the larger the tree the poorer its performance. In other words, the size of a Huffman tree should be kept reasonably small. Referring to FIG. 1B, a curve 21 represents an ideal distribution function curve, wherein the horizontal axis indicates different image patterns and the vertical axis indicates the number of occurrences of each image pattern in the set, i.e., the occurrence probability of each image pattern. The curve 21 has an ideal shape in that those image patterns that occur more often are plotted on or around the mean (vertical) axis, while other image patterns that occur less often are plotted toward both sides of the curve, in a distributed manner along a generally bell-shaped curve. For the sake of illustration, a triangle 22 is shown in FIG. 1B, which connects the apex 21a of the curve 21 to the leftmost and the rightmost cross-points 21b, 21c of the curve 21 with the horizontal axis. The triangle 22 is used to describe the shape of the normal distribution. Generally, a sharper (pointier) triangle yields a better compression result because higher-probability image patterns are concentrated on or around the center line of the triangle 22 (i.e., the mean of the normal distribution) and thus a lesser number of total image patterns exist to form a Huffman tree. On the other hand, a flatter curve 23 represented by a flatter triangle 24 in FIG. 1B yields a poorer compression result. In the extreme case discussed above, where the occurrence probability of every image pattern in the set is the same, the triangle 24 will degenerate into a horizontal line. In this case, there is no point in trying to compress font data, and the Huffman coding becomes completely ineffective.

One experimental result shows that a direct application of the Huffman coding to the set of 13,108 Ming-style Chinese characters sized 16×16 dot-matrix produces a substantially flat triangle like the triangle 24 of FIG. 1B. This means that a voluminous number of image patterns exist in the set, where each row (or column) in the dot-matrix is considered as forming an image pattern, and that most of these image patterns have nearly the same probability of occurrence. The large number of image patterns leads to a large Huffman tree and, consequently, the compression result becomes very poor. This experimental result also explains why the font market, in particular the Asian font market, currently does not offer any product for compressing/decompressing dot-matrix font data. Thus, a need exists for a practical compression and decompression mechanism for dot-matrix font data, in particular for Asian dot-matrix font data including a large number of characters.

BRIEF SUMMARY

This summary sets forth various aspects of the invention and is not intended to limit the boundary of the claims for the invention.

In accordance with one aspect of the present invention, a computer-implemented method is provided for compressing dot-matrix font data including a set of dot-matrix font characters, i.e., characters each represented in a dot-matrix. According to the method, each dot-matrix font character is divided into a horizontal image including horizontal image pattern(s), a vertical image including vertical image pattern(s), and a residual image including residual image pattern(s). Then, the Huffman coding is applied to the horizontal image patterns, the vertical image patterns, and the residual image patterns, respectively. Specifically, the Huffman coding is applied to the horizontal image patterns to produce compressed horizontal codes for the horizontal image patterns in the set. Typically, the produced compressed horizontal codes and the corresponding horizontal image patterns that the codes represent are stored in a horizontal Huffman table. Likewise, the Huffman coding is applied to the vertical image patterns to produce compressed vertical codes for the vertical image patterns in the set, and the produced compressed vertical codes and the corresponding vertical image patterns that the codes represent are stored in a vertical Huffman table. The Huffman coding is also applied to the residual image patterns to produce compressed residual codes for the residual image patterns in the set, and the produced compressed residual codes and the corresponding residual image patterns that the codes represent are stored in a residual Huffman table. Thereafter, the compressed horizontal codes, the compressed vertical codes, and the compressed residual codes may be selectively combined to produce a bit string that represents a compressed form of a dot-matrix font character.

In accordance with another aspect of the invention, in particular when a large number of residual image patterns exist in the set, the residual image patterns may be sorted into multiple groups, while ensuring to keep the residual image patterns that belong to one dot-matrix font character in the same group. Typically, the resulting multiple groups include the same or similar number of the residual image patterns within. Then, the Huffman coding is applied to each group of the residual image patterns to produce compressed residual codes for the group, to thereby form multiple residual Huffman tables that define the compressed residual codes for the multiple groups, respectively.

In accordance with one aspect of the invention, a bit string that represents a compressed form of a dot-matrix font character includes generally three components. The first component is for the horizontal image pattern(s) of the character, and includes a vertical position code, which identifies the vertical position(s) of the horizontal image pattern(s) in the dot-matrix, and the compressed horizontal code(s) for the horizontal image pattern(s) in the character. The second component is for the vertical image pattern(s) of the character, and includes a horizontal position code, which identifies the horizontal position(s) of the vertical image pattern(s) in the dot-matrix, and the compressed vertical code(s) for the vertical image pattern(s) in the character. The third component is for the residual image pattern(s) of the character, and includes a table ID code, which identifies which one of multiple residual Huffman tables defines the compressed residual code(s) for the residual image pattern(s) in the character, and the compressed residual code(s) for the residual image pattern(s).

In accordance with a further aspect of the present invention, a system is provided for decompressing dot-matrix font data including a set of compressed dot-matrix font characters. The system includes a memory device configured to receive a set of compressed dot-matrix font characters to be decompressed, and a processor coupled to the memory and configured to decompress the received set of compressed dot-matrix font characters. Specifically, the system is configured to: (a) restore horizontal image pattern(s) of a character based on determined vertical position(s) of the horizontal image pattern(s) and in reference to a horizontal Huffman table; (b) restore vertical image pattern(s) based on determined horizontal position(s) of the vertical image pattern(s) and in reference to a vertical Huffman table; (c) restore residual image pattern(s) based on identification of a residual Huffman table that defines those residual image pattern(s) and in reference to the identified residual Huffman table; and (d) combine the restored horizontal, vertical, and residual image pattern(s).

In accordance with a still further aspect of the invention, a system is provided for compressing a set of non-compressed dot-matrix font characters. The system includes a memory device configured to receive a set of non-compressed dot-matrix font characters to be compressed, and a processor coupled to the memory and configured to compress the received set of non-compressed dot-matrix font characters.

In accordance with another aspect of the invention, a computer-readable tangible medium is provided that contains computer-executable instructions which, when loaded onto a computer, cause the computer to perform the following steps to decompress compressed dot-matrix font data including a set of compressed dot-matrix font characters. The steps include: (a) receiving a set of compressed dot-matrix font characters; (b) retrieving a horizontal Huffman table, a vertical Huffman table, and one or more residual Huffman table(s); (c) searching the retrieved horizontal, vertical, and residual Huffman tables to obtain horizontal image pattern(s), vertical image pattern(s), and residual image pattern(s) for each character; and (d) combining the obtained horizontal image pattern(s), vertical image pattern(s), and residual image pattern(s) for each character to restore the original character.

In accordance with another aspect of the invention, a computer-readable tangible medium is provided that contains computer-executable instructions which, when loaded onto a computer, cause the computer to decompress compressed dot-matrix font data. The computer-executable instructions include a set of compressed dot-matrix font characters, each in the form of a bit string. The bit string includes: (1) a vertical position code that identifies the vertical position(s) of the horizontal image pattern(s) included in a character; (2) compressed horizontal code(s) for the horizontal image pattern(s) of the character; (3) a horizontal position code that identifies the horizontal position(s) of the vertical image pattern(s) included in the character; (4) compressed vertical code(s) for the vertical image pattern(s) of the character; (5) a table ID code that identifies a residual Huffman table that defines the compressed residual code(s) for the residual image pattern(s) included in the character; and (6) compressed residual code(s) for the residual image pattern(s) of the character.

BRIEF DESCRIPTION OF THE DRAWINGS

FIG. 7C shows sample read-out from a horizontal Huffman table, a vertical Huffman table, and a residual Huffman table, which correspond to the horizontal image, the vertical image, and the residual image of FIGS. 2B-2D, respectively;

DETAILED DESCRIPTION

Figure 1A:
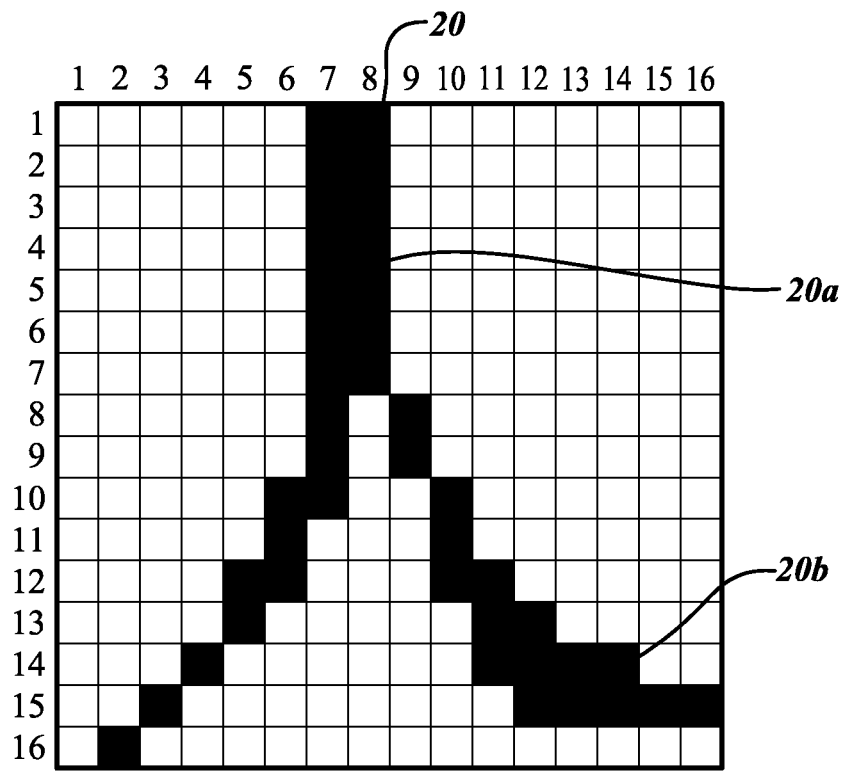
FIG. 1A illustrates a Chinese dot-matrix font character in a 16×16 dot-matrix.
Figure 1B:
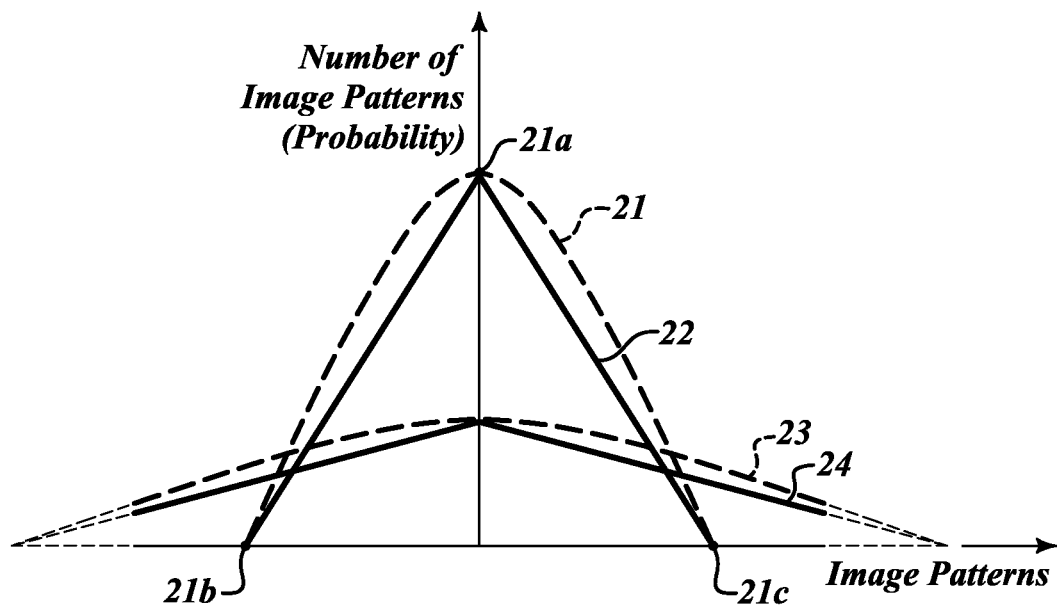
FIG. 1B depicts ideal and non-ideal normal distribution curves of dot-matrix image patterns.
Figure 1C:
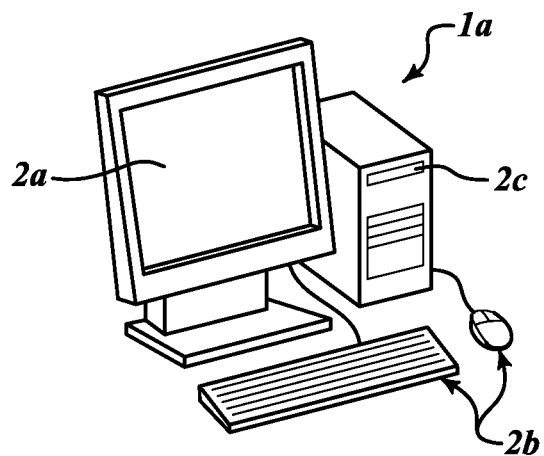
FIG. 1C shows a system suitable for implementing or embodying various methods and systems of the present invention.

FIG. 1C illustrates a typical computing environment, in which various compression/decompression methods and systems of the present invention may be implemented. A general purpose computer $1a$, including an output device (e.g., a display) $2a$, an input device $2b$ (e.g., a keyboard, a mouse), and a suitable drive mechanism $2c$ (e.g., a DVD/CD-ROM drive, a USB flash drive), is fully capable of carrying out various methods, or incorporating various systems, of the present invention. Other types of computing systems, such as networked or mainframe-based systems, may also be used, as apparent to those skilled in the art. Generally, the computer $1a$ may receive the original dot-matrix font data, for example via the drive mechanism $2c$, and applies a compression method of the present invention to the received data to generate compressed dot-matrix font data. The computer $1a$ may then output the compressed dot-matrix font data, as stored in a computer-readable tangible memory device for example. The computer $1a$ may also receive compressed dot-matrix font data, and applies a decompression method of the present invention to the received data to generate decompressed (original) dot-matrix font data. The computer $1a$ may then output the decompressed dot-matrix font data, for display on the output device $2a$ for example.

Figure 3:
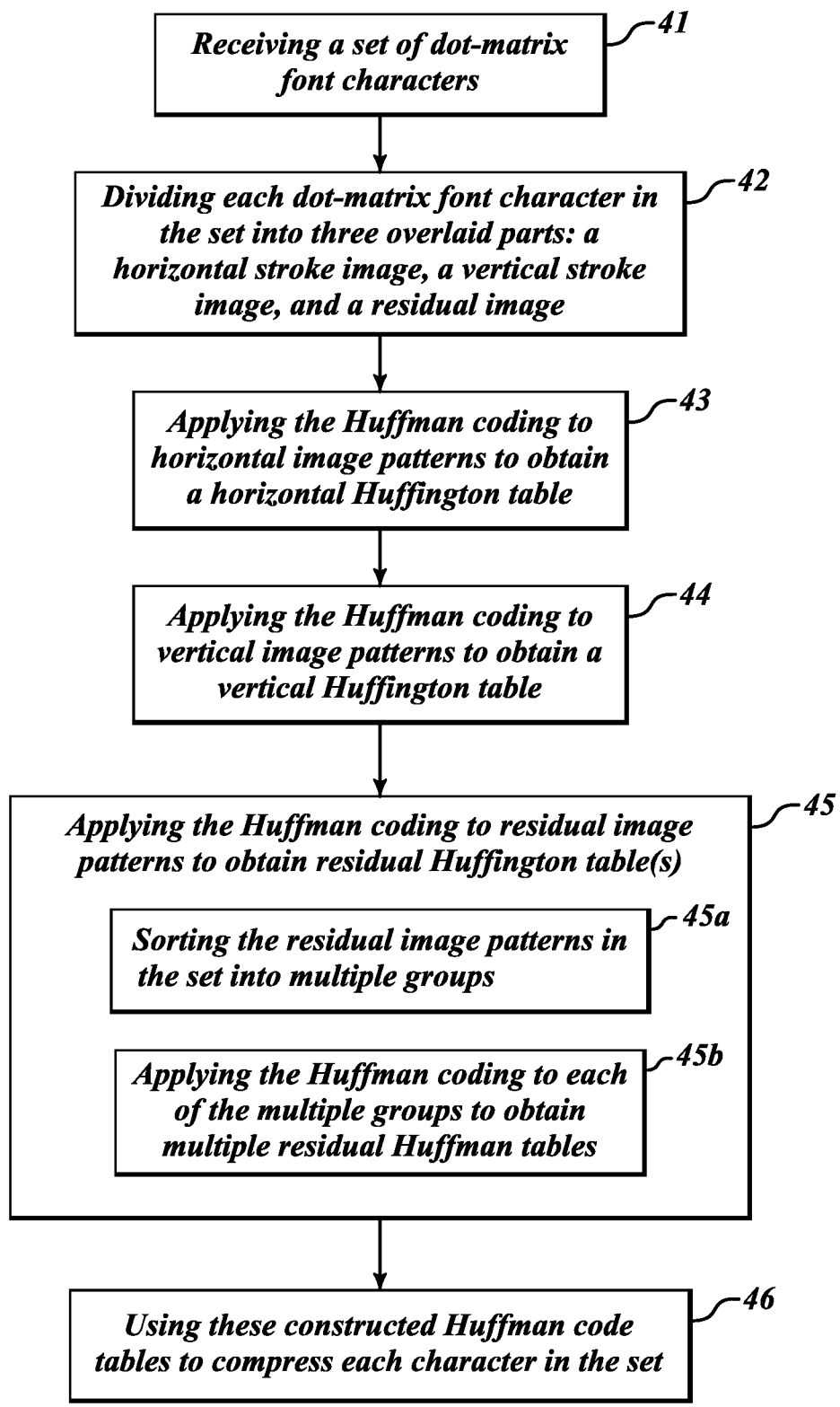
FIG. 3 is a flowchart illustrating a method of compressing dot-matrix font data according to one embodiment of the present invention.

FIG. 3 is a flowchart illustrating a method of compressing dot-matrix font data according to one embodiment of the present invention. In step 41, dot-matrix font data including a set of dot-matrix font characters are received. In the following description, a set of 13,108 Ming-style 16×16 dot-matrix Chinese font characters is used as an example to illustrate various embodiments of the present invention. It should be understood, however, that the present invention is equally applicable to other types of dot-matrix font characters, including both Asian and non-Asian dot-matrix font characters.

Figure 2A:
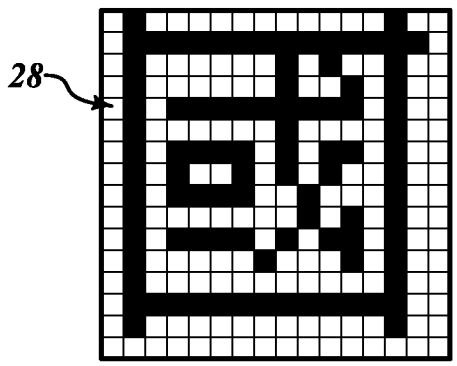
FIG. 2A illustrates a dot-matrix font character, which is divided into three parts including a horizontal image, a vertical image, and a residual image of FIGS. 2B-2D, respectively.
Figure 2B:
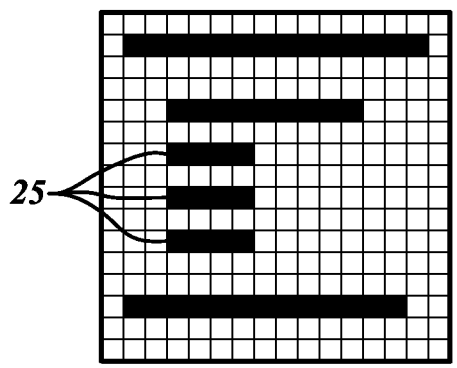
FIGS. 2B-2D respectively illustrate horizontal image patterns in the horizontal image, vertical image patterns in the vertical image, and residual image patterns in the residual image.
Figure 2C:
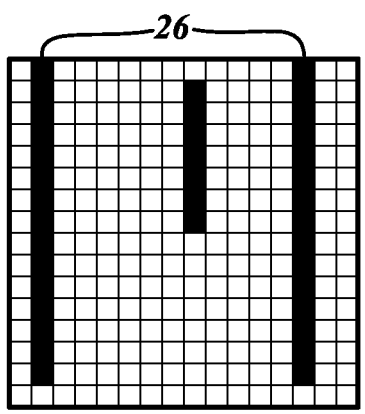
Figure 2D:
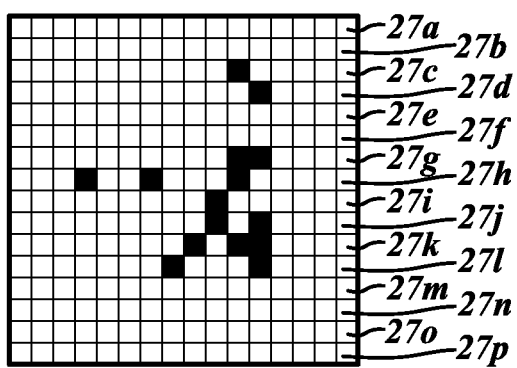

In step 42, each dot-matrix font character, such as a character 28 shown in FIG. 2A, is divided into three elements: a horizontal stroke image of FIG. 2B including one or more horizontal image patterns (or horizontal strokes) 25, a vertical stroke image of FIG. 2C including one or more vertical image patterns (or vertical strokes) 26, and a residual image of FIG. 2D including one or more residual image patterns $27a$-$27p$ formed along multiple rows of the dot-matrix, for example. The residual image of FIG. 2D is obtained by removing the horizontal and vertical stroke images of FIGS. 2B and 2C from the original dot-matrix font character image of FIG. 2A.

More specifically, for example, FIG. 2B shows six horizontal strokes, which include four horizontal image patterns because three of the horizontal strokes 25 have the same horizontal image pattern. A horizontal stroke may be identified as four or more consecutive (activated) dots in a row, though the threshold number of dots to identify a stroke is not limited to four, and may be three or five or more. FIG. 2C shows three vertical strokes, which include two vertical image patterns because two of the vertical strokes 26 have the same vertical image pattern. A vertical stroke may be identified as four or more consecutive (activated) dots in a column. Again, the threshold number of dots to identify a vertical stroke is not limited to four. Experimental results show that the longer the minimum number of consecutive (activated) dots to identify a horizontal or vertical stroke, the lesser number of horizontal or vertical image patterns are identified, with correspondingly more residual image patterns being generated. Since the total number of image patterns to be contained in a Huffman tree should be kept reasonably small for the purpose of compression efficiency, a user-interface software tool may be provided, for use on the computer 1*a* of FIG. 1C, to allow a user to experiment with selectively setting the threshold number of dots to identify a horizontal or vertical stroke, so as to prevent production of too many horizontal/vertical image patterns and/or too many residual image patterns. In accordance with one aspect of the present invention, a Huffman tree is considered sufficiently small to achieve effective compression of data if it contains less than one hundred image patterns.

FIG. 2D shows nine residual image patterns 27*a*, 27*c*, 27*d*, 27*g*, 27*h*, 27*i*, 27*j*, 27*k*, and 27*l*, each forming a row in the 16×16 matrix of the illustrated example. These nine residual image patterns are different from each other, while the first residual image pattern 27*a*, which consists of all sixteen non-activated (empty) dots in a row, appears repeatedly in eight different rows (27*a*, 27*b*, 27*e*, 27*f*, 27*m*, 27*n*, 27*o*, and 27*p*).

Combining or overlaying the images of FIGS. 2B-2D produces the original dot-matrix font character of FIG. 2A.

Step 42 is performed for each of the dot-matrix font characters in the set, so as to produce three sets of image patterns for the whole set: a set of horizontal image patterns, a set of vertical image patterns, and a set of residual image patterns.

In the above described example, the residual image patterns are taken so that each forms a row in the 2k×2k matrix. Alternatively, the residual image patterns may be taken so that each forms a column in the 2k×2k matrix. Further alternatively, the residual image patterns may be taken so that each forms an equally sized k×k matrix (total 4 residual image patterns), k/2×k/2 matrix (total 16 residual image patterns), etc. in the 2k×2k dot-matrix.

In step 43, the Huffman coding is applied to the horizontal image patterns in the set, to thereby produce compressed horizontal codes for the horizontal image patterns in the set. Specifically, the Huffman coding is applied to the horizontal image patterns, by first calculating the probability of occurrence of each horizontal image pattern in the set. The horizontal image patterns are then sorted according to their probability of occurrence from high to low. Thereafter, from low to high, two adjacent horizontal image patterns are sequentially merged into nodes, and the step of sorting according to the probability of occurrence is repeated until all horizontal image patterns are merged to a single root, to thereby form a horizontal Huffman tree. Then, paths of the tree are traced from the root to leaves while assigning shorter bit-length codes to the horizontal image patterns with higher occurrence probability and assigning longer bit-length codes to the horizontal image patterns with lower occurrence probability. The generated compressed horizontal codes and the corresponding horizontal image patterns that the codes represent are recorded in a horizontal Huffman table. (See, FIG. 7C.)

Figure 4A:
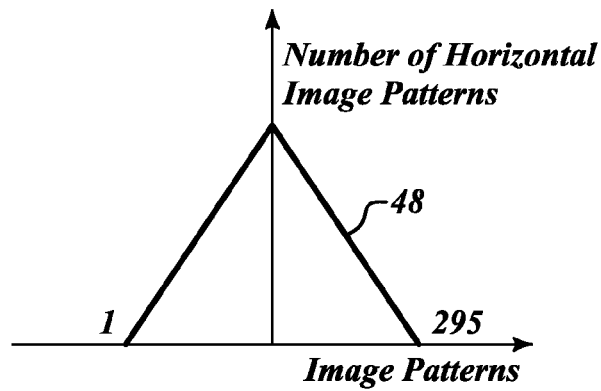
FIGS. 4A-4C illustrate three triangles that denote normal distribution shapes, which respectively result from applying the Huffman coding to the horizontal image patterns, the vertical image patterns, and the residual image patterns in a set of dot-matrix font characters, according to one embodiment of the present invention.

FIG. 4A shows a triangle 48 that describes the shape of a sample normal distribution curve for the horizontal image patterns in the set. In the illustrated example, total 295 horizontal image patterns are included in the set, with their occurrence probability distributed according to a nearly ideal distribution curve as represented by the sharp triangle shape 48.

Referring back to FIG. 3, in step 44, the Huffman coding is applied also to the vertical image patterns in the set, to thereby produce compressed vertical codes for the vertical image patterns in the set. Specifically, the Huffman coding is applied to the vertical image patterns, by first calculating the probability of occurrence of each vertical image pattern in the set. The vertical image patterns are then sorted according to their probability of occurrence from high to low. Thereafter, from low to high, two adjacent vertical image patterns are sequentially merged into nodes, and the step of sorting according to the probability of occurrence is repeated until all vertical image patterns are merged to a single root, to thereby form a vertical Huffman tree. Then, paths of the tree are traced from the root to leaves while assigning shorter bit-length codes to the vertical image patterns with higher occurrence probability and assigning longer bit-length codes to the vertical image patterns with lower occurrence probability. The generated compressed vertical codes and the corresponding vertical image patterns that the codes represent are stored in a vertical Huffman table.

Figure 4B:
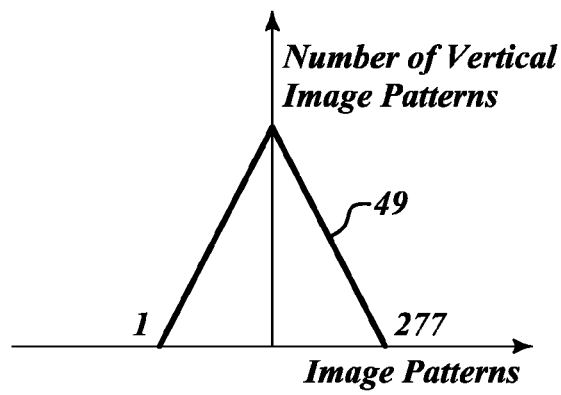

FIG. 4B shows a triangle 49 that describes the shape of a sample normal distribution curve of the vertical image patterns in the set. In the illustrated example, total 277 vertical image patterns are included in the set, with their occurrence probability distributed according to a nearly ideal distribution curve as represented by the sharp triangle shape 49.

Referring back to FIG. 3, in step 45, the Huffman coding is applied also to the residual image patterns in the set, to thereby produce compressed residual codes for the residual image patterns in the set.

Figure 4C:
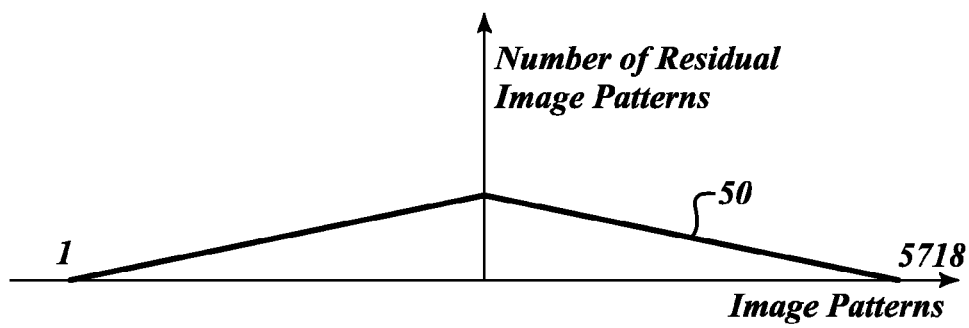

FIG. 4C shows a triangle 50 that describes the shape of a sample normal distribution curve of the residual image patterns in the set. In the illustrated example, total 5,718 residual image patterns are included in the set, with their occurrence probability distributed rather flat as compared to the triangles 48 and 49 of FIGS. 4A and 4B. The flat shape indicates that most of the residual image patterns have similar probability of occurrence and, accordingly, the compression result is rather poor. Preferably, the total number of residual image patterns included in a Huffman tree should be reduced in such a way that their normal distribution will take the shape of a sharper (pointier) triangle, i.e., so that their probability of occurrence noticeably differs between higher-probability image patterns gathered around the mean axis and lower-probability image patterns appearing toward both ends of the distribution curve.

Thus, according to one aspect of the present invention, in step 45*a* of FIG. 3, the residual image patterns in the set are sorted into multiple groups and, in step 45*b*, the Huffman coding is applied to each group of the residual image patterns, separately, to produce multiple residual Huffman tables for the multiple groups, respectively. This way, a reasonably small number of residual image patterns can be organized into each of the multiple residual Huffman trees and, hence, the normal distribution for each of the multiple residual Huffman trees will follow a nearly ideal bell-curved shape. In accordance with various embodiments of the present invention, the residual image patterns are sorted into multiple groups, while ensuring to keep the residual image pattern(s) that form one character in the same group so that the compressed residual codes for all of residual image patterns that form the same character are contained in a single residual Huffman tree. In accordance with further embodiments of the present invention, the size of each group, i.e., the number of residual image patterns sorted into each group, is the same or substantially the same so that the resulting multiple residual Huffman trees will have substantially the same performance.

Figure 5A:
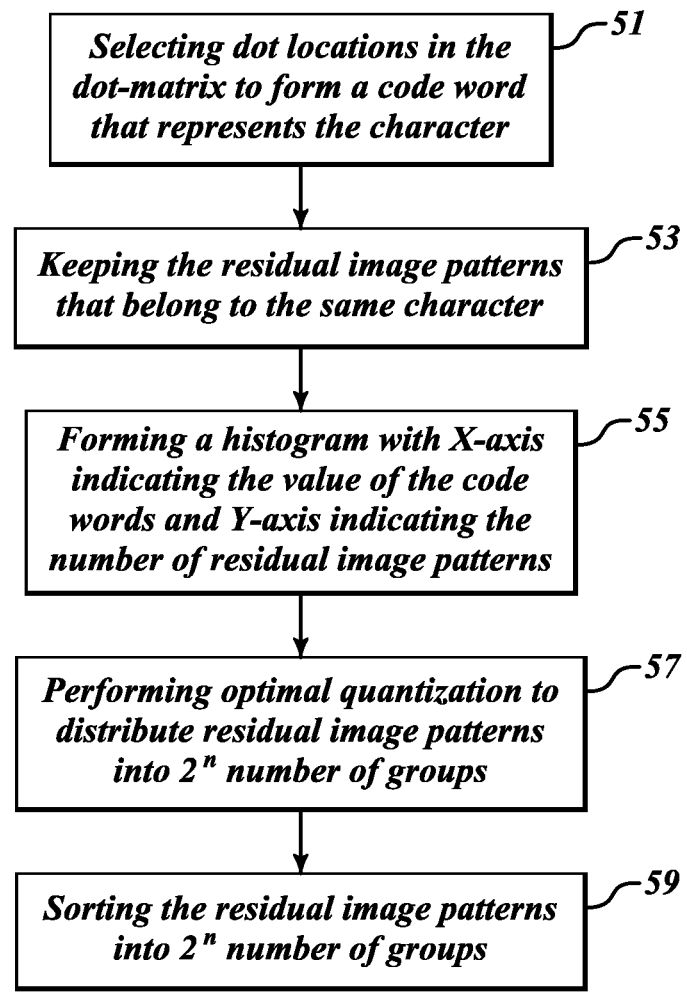
FIG. 5A is a flowchart illustrating a method of sorting the residual image patterns in a set of dot-matrix font characters into multiple groups, according to one embodiment of the present invention.
Figure 5B:
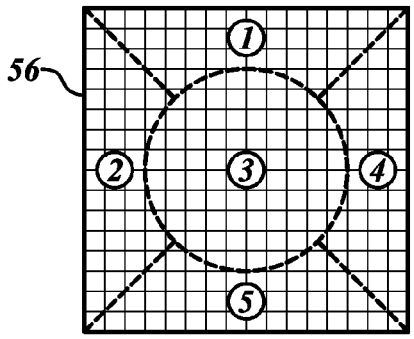
FIGS. 5B-5E illustrate methods of selecting a number of dot locations in a dot-matrix to thereby form a dot-location bit sequence for each residual image of a dot-matrix font character.
Figure 5C:
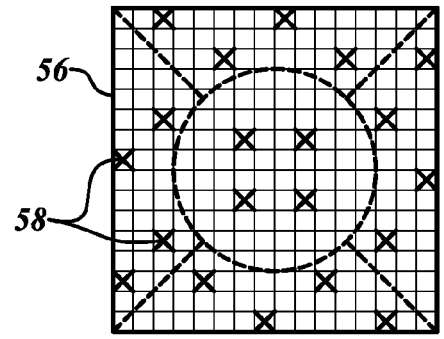
Figure 5D:
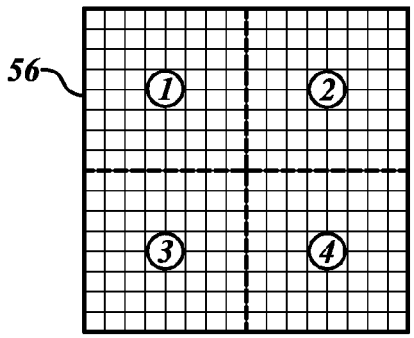
Figure 5E:
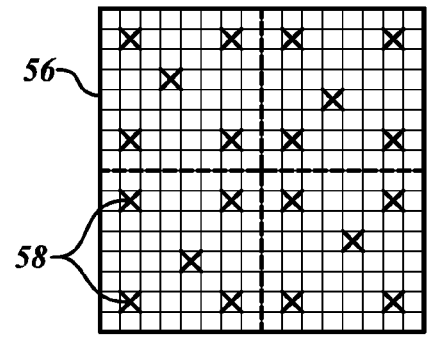

FIG. 5A is a flowchart illustrating a method of sorting the residual image patterns in the set into multiple groups, according to one embodiment of the present invention. In step 51, "s" number of dot locations are selected in the 2k×2k dot-matrix, for example twenty locations in the 16×16 dot-matrix in the illustrated embodiment. Referring additionally to FIGS. 5B and 5C, in one example, twenty dot locations 58 (represented by "x" marks) are selected in the 2k×2k dot-matrix 56. In the example of FIG. 5B, the dot-matrix 56 is first divided into five areas (1)-(5). Then, four dot locations are selected in each of the five areas, as shown in FIG. 5C, total twenty dot locations. FIGS. 5D and 5E illustrate another example of selecting twenty dot locations 58 in the 16×16 dot-matrix 56. In this example, the dot-matrix 56 is first divided into four areas (1)-(4), and five dot locations are selected in each of the four areas, as shown in FIG. 5E. The selected dot locations are then arranged in a sequence.

Figure 5F:
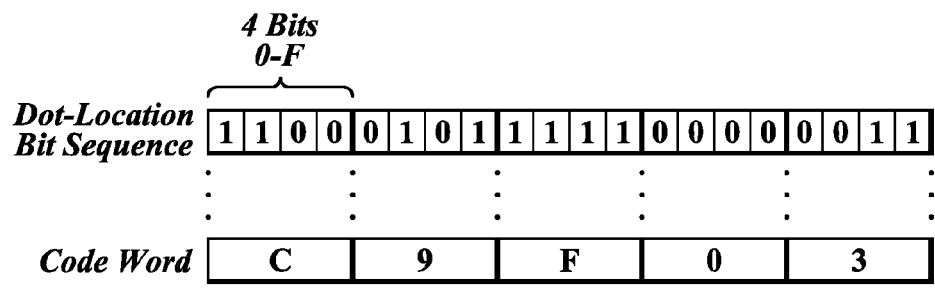
FIG. 5F illustrates a method of using a dot-location bit sequence to form a code word for each residual image of a dot-matrix font character, for the purpose of sorting the residual image patterns in the set into multiple groups.

Next, with respect to each residual image of a character as a whole, as shown in FIG. 2D, a dot-location bit sequence is formed that indicates which of the selected dot locations in the sequence is/are occupied by that residual image. In other words, it is determined how well the residual image occupies or coincides with the twenty dot locations in the sequence, with bit "1" indicating occupancy and bit "0" indicating no occupancy. FIG. 5F illustrates a sample dot-location bit sequence including 20 bits for indicating occupancy/non-occupancy of twenty dot locations selected from the dot-matrix 56. The sample dot-location bit sequence is—11000101111100000011—, meaning that ten of the twenty dot locations selected from the dot-matrix are occupied by the residual image being considered. Specifically, the $1^{st}$, $2^{nd}$, $6^{th}$, $8^{th}$ $9^{th}$, $10^{th}$, $11^{th}$, $12^{th}$, $19^{th}$, and $20^{th}$ dot locations in the sequence are occupied. Still referring to FIG. 5F, the dot-location bit sequence can be represented as a code word in hexadecimal notation, that is, C9F03 in the illustrated example. Specifically, the 20 bits in the dot-location bit sequence are divided into five groups of 4 bits, and the 4 bits in binary are converted into a hexadecimal code (0~F), to together form a code word of 5 symbols. It should be apparent to one skilled in the art that use of a code word in hexadecimal notation is for illustrative purposes only, and the dot-location bit sequence may be used as a code word, or the dot-location bit sequence may be converted into another notation/form to form a code word. In any event, a code word is formed based on a dot-location bit sequence to represent one residual image, which consists of one or more residual image patterns.

Note that, since a code word is generated for each residual image as a whole, all of the residual image patterns that form one residual image of a dot-matrix font character are assigned the same code word. Thus, in this embodiment in step 53, the residual image patterns that belong to the same dot-matrix font character are kept together based on the same code word. Also, residual images having similar code words are considered to share a similar topography and, accordingly, are considered to share similar residual image patterns within.

Figure 6A:
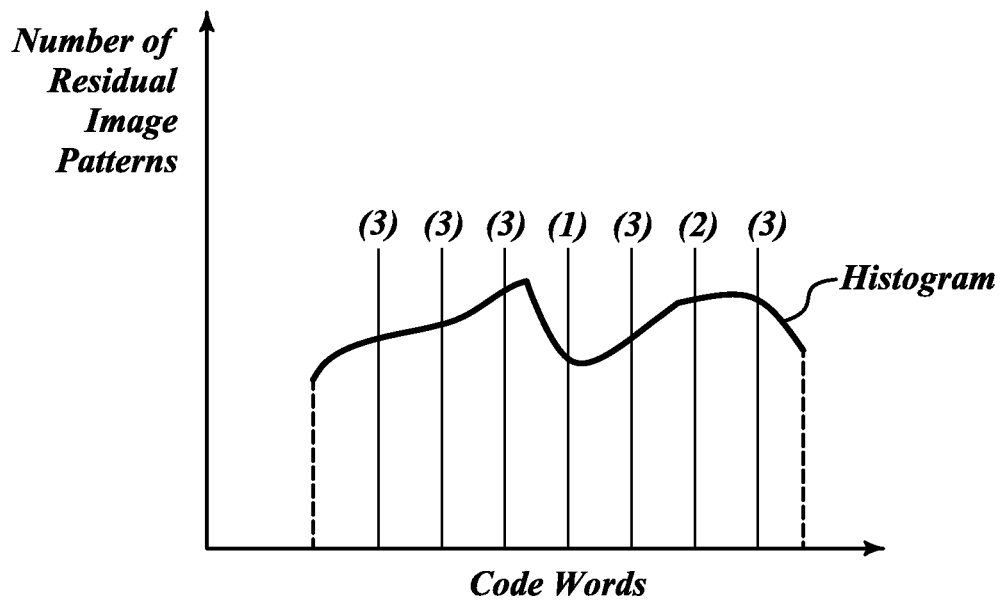
FIGS. 6A and 6B illustrate a method of sorting the residual image patterns in the set into multiple groups using a histogram.

In step 55, referring additionally to FIG. 6A, a histogram is formed, with the horizontal axis indicating the code words of the residual image patterns, and the vertical axis indicating the number of the residual image patterns having the same code word, for each of the plural code words.

Figure 6B:
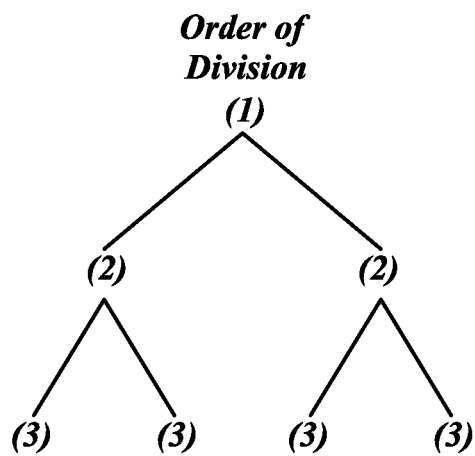

In step 57, optimal quantization is performed on the histogram to evenly distribute the residual image patterns into $2^n$ number of groups (n: positive integer). Referring additionally to FIGS. 6A and 6B, the histogram of FIG. 6A is first divided along line (1) into two groups, then each of the two groups is divided along line (2) into total four groups, and then each of the four groups is further divided along line (3) into total eight groups. In other words, according to the binary tree of FIG. 6B from the top to the bottom, the area of the histogram is successively divided into two equal sub-areas.

In step 59, the residual image patterns that fall into the same sub-area are sorted into one group. Thus, the residual image patterns in the set of dot-matrix font characters are sorted into multiple ($2^n$) groups, wherein each group contains the same or substantially the same, and reasonably small, number of residual image patterns.

Referring back to FIG. 3, in step 45b, the Huffman coding is applied to each of the multiple groups of residual image patterns to thereby obtain multiple residual Huffman tables, respectively. Specifically, the Huffman coding is applied to residual image patterns in one group, by first determining the probability of occurrence of each residual image pattern in the group. The residual image patterns are then sorted according to their probability of occurrence from high to low. Thereafter, from low to high, two adjacent residual image patterns are sequentially merged into nodes, and the step of sorting according to the probability of occurrence is repeated until all residual image patterns are merged to a single root, to thereby form a residual Huffman tree. Then, paths of the tree are traced from the root to leaves while assigning shorter bit-length codes to the residual image patterns with higher occurrence probability and assigning longer bit-length codes to the residual image patterns with lower occurrence probability. The generated compressed residual codes and their corresponding residual image patterns that the codes represent are stored in a residual Huffman table for the group. (See, FIG. 7C.) The same process is repeated for each of the multiple ($2^n$) groups of residual image patterns, to obtain multiple ($2^n$) residual Huffman tables that each defines the compressed residual codes for their corresponding residual image patterns in the group. Note that, when $2^n$ number of residual Huffman tables are created, each residual Huffman table can be identified by a table ID code that ranges from value 1 to value $2^n$.

Still referring to FIG. 3, finally in step 46, various Huffman tables that have been generated, including the horizontal Huffman table, the vertical Huffman table, and the one or more (e.g., $2^n$) residual Huffman table(s), are used to define a compressed dot-matrix font character.

It should be apparent to one skilled in the art that the order of performing steps 43, 44, and 45 in FIG. 3, to form the horizontal, vertical, and residual Huffman tables, is not limited to that described above, and these steps may be performed in any other order, or simultaneously.

It should be also noted that, while one horizontal Huffman table and one vertical Huffman table are generated in the above-described embodiment, the present invention is not so limited, and two or more horizontal and/or vertical Huffman tables may be generated, for example when the number of horizontal and/or vertical image patterns in a set of characters is too large.

Figure 7A:
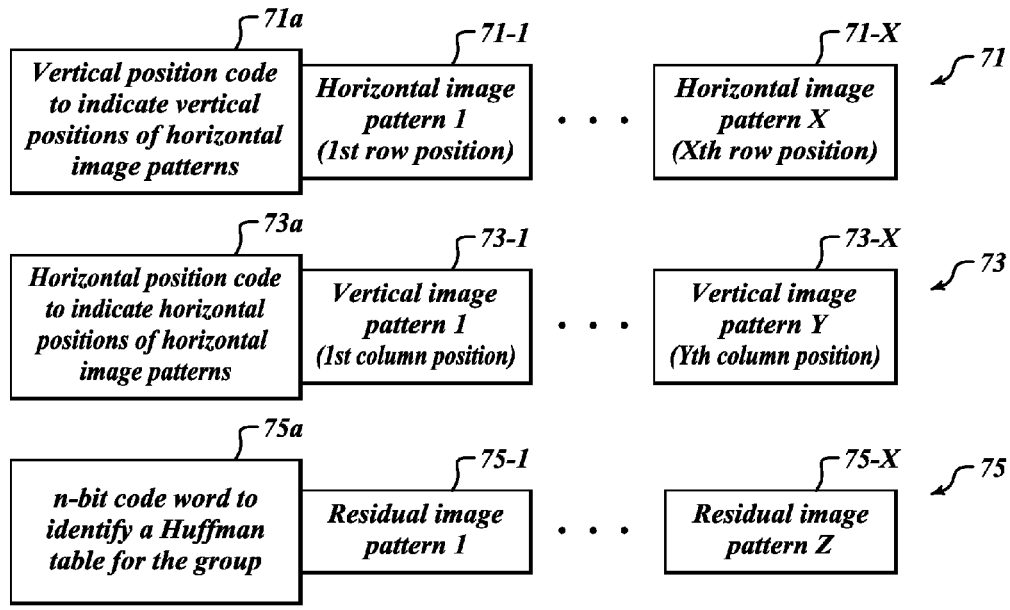
FIG. 7A illustrates a sample data format of a compressed dot-matrix font character.
Figure 7B:
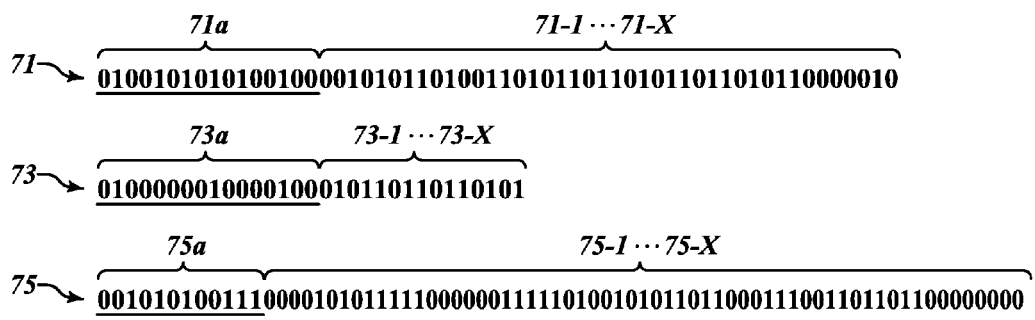
FIG. 7B illustrates a sample bit string that represents a compressed form of the dot-matrix font character of FIG. 2A, according to the data format of FIG. 7A.

In accordance with various embodiments of the present invention, the compressed form of a dot-matrix font character has the data format of FIG. 7A, which may be expressed as a bit string as shown in FIG. 7B. In the illustrated embodiment, the bit string of FIG. 7B is a compressed form of the dot-matrix font character 28 of FIG. 2A.

FIG. 7A shows the data format of a compressed dot-matrix font character according to various embodiments of the present invention. A reference number 71 refers to a compressed horizontal image, including a vertical position code 71a that identifies the vertical position(s) of the horizontal image pattern(s) in the dot-matrix font character, followed by one or more compressed horizontal codes 71-1 ... 71-X that represent the horizontal image patterns included in the character. Referring additionally to FIG. 7B, which shows a compressed bit string sample for the character 28 of FIG. 2A, the compressed horizontal image 71 includes the vertical position code 71a of 0100101010100100, with bit "1" indicating that a horizontal image pattern exists at that vertical position and bit "0" indicating that a horizontal image pattern does not exist at that vertical position. Thus, this particular vertical position code 71a indicates that the character includes horizontal image patterns (horizontal strokes) in the $2^{nd}$, $5^{th}$, $7^{th}$, $9^{th}$, $11^{th}$, and $14^{th}$ rows, from the top to the bottom, of the dot-matrix as shown in FIG. 2B. In other words, there are six horizontal image patterns that form this character. The six compressed horizontal codes, 71-1 through 71-6, respectively represent these six horizontal image patterns. Specifically, referring additionally to FIG. 7O, in the illustrated example, the first compressed horizontal code 71-1 is 001010, the second compressed horizontal code 71-2 is 110100, the third through fifth compressed horizontal codes 71-3 through 71-5 are all the same code, 11010110 (corresponding to the same horizontal stroke 25 appearing three times in FIG. 2B), and the sixth compressed horizontal code 71-6 is 000010. Because in the Huffman coding no compressed code forms a prefix (the initial part) of another compressed code, these six compressed horizontal codes may be sequentially arranged in the order of their appearance, that is, from the $2^{nd}$ to the $14^{th}$ row of the dot-matrix, as shown in FIG. 7B. Then, during decompression, first, the vertical positions of the horizontal image patterns are identified based on the vertical position code 71a. Then, six compressed horizontal codes 71-1 through 71-6 are read and, in reference to the horizontal Huffman table (see FIG. 7O), six horizontal image patterns that respectively correspond to the six compressed horizontal codes 71-1 through 71-6 are recovered and placed at the six identified vertical positions. A method of decompression according to the present invention will be more fully described below in reference to FIG. 8.

Still referring to FIG. 7A, a reference number 73 refers to a compressed vertical image, including a horizontal position code 73a that identifies the horizontal position(s) of the vertical image pattern(s) in the dot-matrix font character, followed by one or more compressed vertical codes 73-1 ... 73-Y that represent the vertical image patterns included in the character. Referring additionally to FIG. 7B, the compressed vertical image 73 includes the horizontal position code 73a of 0100000010000100, indicating that this character includes vertical image patterns (vertical strokes) in the $2^{nd}$, $9^{th}$ and $14^{th}$ columns, from the left to the right, of the dot-matrix as shown in FIG. 2O. Thus, there are three vertical image patterns that form this character. The three compressed vertical codes, 73-1 through 73-3, respectively represent these three vertical image patterns. Specifically, referring additionally to FIG. 7O, in the illustrated example, the first compressed vertical code 73-1 is 0101, the second compressed vertical code 73-2 is 1011011, and the third compressed vertical code 73-3 is 0101, which is the same as the first compressed vertical code 73-1 (corresponding to the same vertical stroke 26 appearing twice in FIG. 2O). These three compressed vertical codes may be sequentially arranged in the order of their appearance, that is, from the $2^{nd}$ to the $14^{th}$ column of the dot-matrix, as shown in FIG. 7O. Then, during decompression, first, the horizontal positions of the vertical image patterns are identified based on the horizontal position code 73a. Then, three compressed vertical codes 73-1 through 73-3 are read and, in reference to the vertical Huffman table (see FIG. 7O), three vertical image patterns that respectively correspond to the three compressed vertical codes 73-1 through 73-3 are recovered and placed at the three identified horizontal positions.

In the illustrated example above, the length of the vertical position code 71a and the horizontal position code 73a is two bytes (16 bits) to correspond to the size of the 16×16 dot-matrix. Of course, the length of the vertical and horizontal position codes 71a and 73a is not so limited, and may vary according to the size of the dot-matrix used in each application.

Still referring to FIG. 7A, a reference number 75 refers to a compressed residual image, including a residual Huffman table ID code 75a that identifies a residual Huffman table that defines the residual image pattern(s) in the dot-matrix font character, followed by one or more compressed residual codes 75-1 ... 75-Z that represent the residual image patterns included in the character. Referring additionally to FIG. 7B, the compressed residual image 75 includes an "n-bit" residual Huffman table ID code 75a of 001010100111. As described above, according to various embodiments of the present invention, the residual image patterns are sorted into $2^n$ number of groups. Thus, the residual Huffman table ID code 75a may consist of n bits to identify each of the $2^n$ number of residual Huffman tables.

Referring additionally to FIG. 7C, the compressed residual image 75, in addition to the residual Huffman table ID code 75a, includes sixteen compressed residual codes 75-1 through 75-16. These are: (1) 00, (2) 00, (3) 10101, (4) 111100, (5) 00, (6) 00, (7) 11111, (8) 010010, (9) 10110, (10) 110001, (11) 110011, (12) 011011, (13) 00, (14) 00, (15) 00, and (16) 00. These compressed residual codes respectively represent corresponding residual image patterns. Note that the compressed residual code "00" appears eight times, corresponding to eight "empty" rows (e.g., 27a) in the residual image of FIG. 2D All of these sixteen compressed residual codes 75-1 through 75-16 are included in the residual Huffman table identified by the residual Huffman table ID code 75a. This is so because, in various embodiments of the invention described above, the residual image patterns that belong to one character are sorted into the same group, for which one residual Huffman table is created. As with the compressed horizontal and vertical codes, these sixteen compressed residual codes may be sequentially arranged, as shown in FIG. 7B, in the order of their appearance, that is, from the $1^{st}$ to the $16^{th}$ row of the 16×16 dot-matrix as shown in FIG. 2D, for example. In other words, these sixteen compressed residual codes represent sixteen residual image patterns to appear from the top to the bottom of the dot-matrix as shown in FIG. 2D. Then, during decompression, first, the residual Huffman table to be looked up is identified based on the residual Huffman table ID code 75a. Then, compressed residual codes (for example, sixteen compressed residual codes in the case of the 16×16 dot-matrix) are sequentially read and, in reference to the identified residual Huffman table (see FIG. 7C), residual image patterns that respectively correspond to the compressed residual codes are recovered and sequentially placed in the dot-matrix.

The total number of bits included in the compressed bit string of FIG. 7B, which is a compressed form of the dot-matrix font character 28 of FIG. 2A, is 20.25 bytes. Since the bit requirement for the original dot-matrix font character 28 is 16×16=32 bytes, the compression ratio of this example 1:0.6328.

Figure 8:
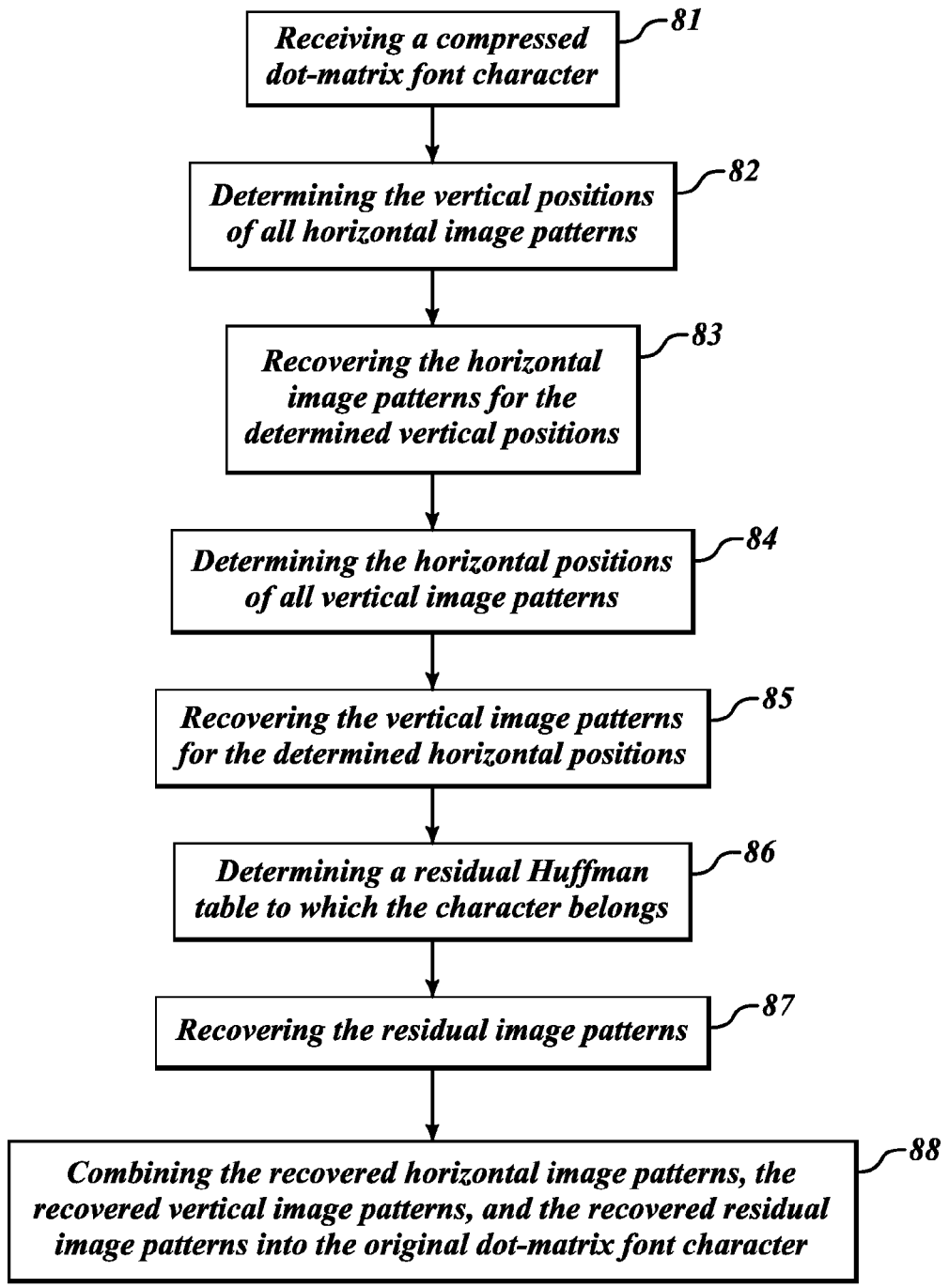
FIG. 8 is a flowchart illustrating a method of decompressing compressed dot-matrix font data back to the original dot-matrix font data, according to one embodiment of the present invention.

FIG. 8 is a flowchart illustrating a method of decompressing the compressed dot-matrix font data back to the original dot-matrix font data, according to one embodiment of the present invention. Generally, the decompression process is a reversed process of the compression process. In step 81, a compressed dot-matrix font character, in the form of a bit string as shown in FIG. 7B for example, is received. In step 82, the vertical positions of all horizontal image patterns included in the character are determined based on the vertical position code 71*a*. In step 83, the horizontal image patterns corresponding to the compressed horizontal codes 71-1 through 71-X are recovered in reference to the horizontal Huffman table, and placed at the determined vertical positions (see, FIG. 2B). Similarly, in step 84, the horizontal positions of all vertical image patterns included in the character are determined based on the horizontal position code 73*a*. In step 85, the vertical image patterns corresponding to the compressed vertical codes 73-1 through 73-Y are recovered in reference to the vertical Huffman table, and placed at the determined horizontal positions (see, FIG. 2C). In step 86, a residual Huffman table to be referenced is identified based on the residual Huffman table ID code 75*a*. In step 87, the residual image patterns corresponding to the compressed residual codes 75-1 through 75-Z are recovered in reference to the identified residual Huffman table, and sequentially positioned in the dot-matrix (see, FIG. 2D). Finally, in step 88, the recovered horizontal image patterns, the recovered vertical image patterns, and the recovered residual image patterns are combined into the original dot-matrix font character (see, FIG. 2A).

Figure 9:
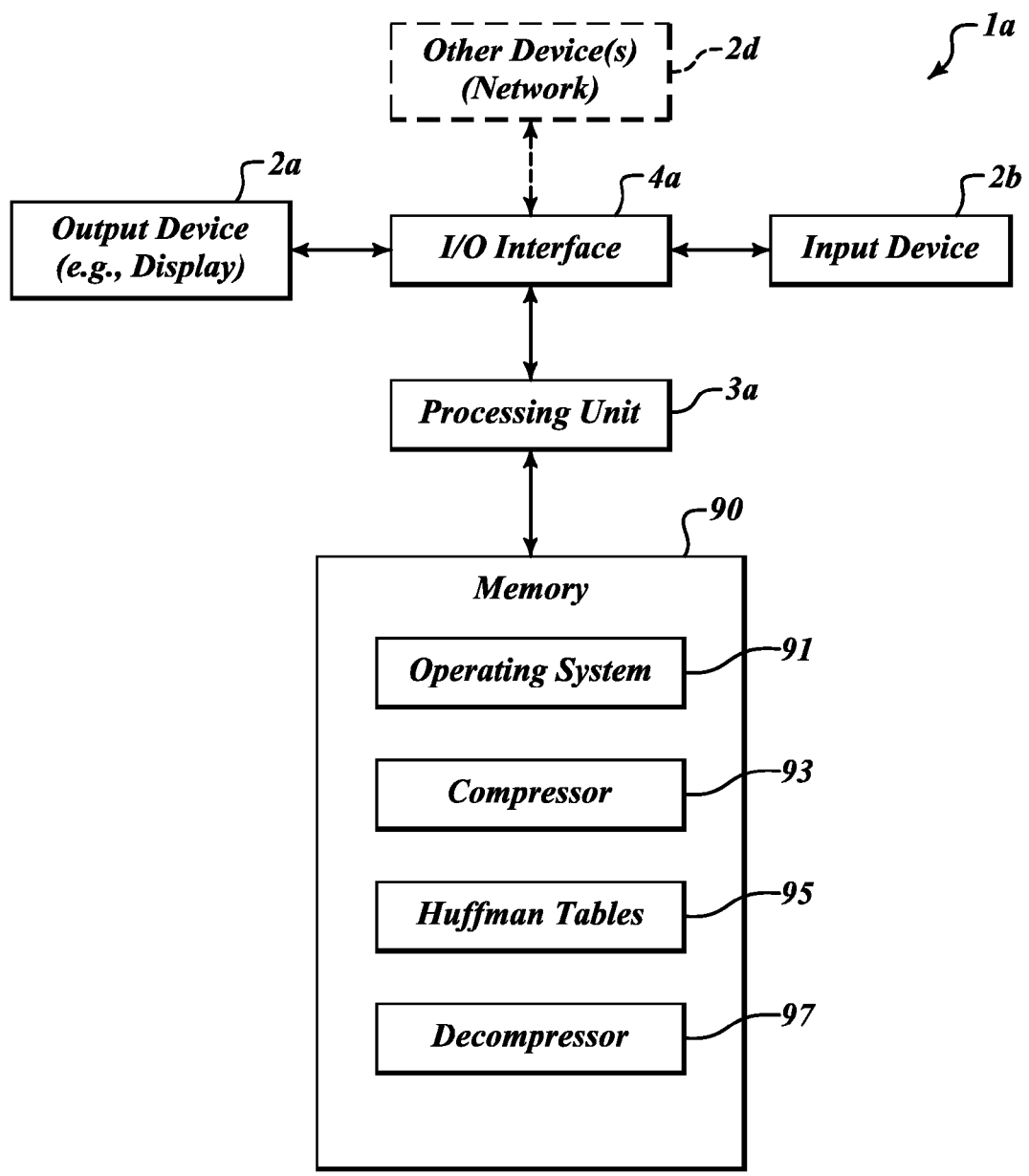
FIG. 9 is a block diagram of a system suitable for implementing or embodiment various methods and systems of the present invention.

FIG. 9 is a block diagram of a system suitable for implementing or embodying various methods and systems of the present invention for compressing and/or decompressing dot-matrix font data. The system 1*a* may be a general purpose computer as shown in FIG. 1C, and includes a processing unit 3*a*, I/O interface 4*a*, output device 2*a* (e.g., a display), input device 2*b* (e.g., a keyboard, a mouse), other devices 2*d* with which the I/O interface 4*a* communicates, and memory 90, which are all coupled together through bus lines.

The input/output ("I/O") interface 4*a* is used to communicate wirelessly or via a wired link with other devices 2*d*, which may be on a network, for receiving the original (non-compressed) or compressed dot-matrix font data from another device or for transferring/transmitting compressed or decompressed dot-matrix font data to another device. The I/O interface 4*a* includes the necessary circuitry for such a connection, and is also constructed for use with the necessary protocols. The I/O interface 4*a* also connects the processing unit 3*a* to the input device 2*b* and the output device 2*a*.

The memory 90 generally comprises a random access memory ("RAM"), a read-only memory ("ROM"), and a permanent mass storage device. In the illustrated embodiment, the memory 90 includes an operating system 91, a compressor module 93, Huffman tables 95, and a decompressor module 97. Each of these elements may be formed of a collection/combination of hardware and software to carry out its specific function. Specifically, the compressor module 93 is configured, in cooperation with the processing unit 3*a*, to compress a dot-matrix font character according to various embodiments of the present invention described above. Similarly, the decompressor module 97 is configured, in cooperation with the processing unit 3*a*, to decompress a compressed dot-matrix font character according to various embodiments of the present invention described above. The Huffman tables 95, generated by the compressor module 93, are stored in the memory 90 for use by the decompressor module 9, or may be transmitted/transferred to another device for use during decompression of the dot-matrix font data that have been compressed according to the present invention. Specifically, the compressor module 93, after compressing dot-matrix font data, may package the compressed dot-matrix font data in a computer-readable file, together with the generated Huffman tables 95 and further with computer-executable instructions for decompressing the compressed dot-matrix font data. The packaged file may then be transmitted/transferred to another device via the I/O interface 4*a*.

It should be apparent to those skilled in the art that the configuration of a system of the present invention is not limited to what is illustrated in FIG. 9, and various other configurations are possible. For example, some of the functions performed by various elements (or components) of the system 1*a* may be combined to be performed by a single element; and a function or routine performed by a single element may be divided to be performed by multiple elements in a distributed manner.

As described above, a set of compressed dot-matrix font characters, generated by the compressor module 93, may be stored in a computer-readable file, which may then be stored in a computer-readable tangible medium or transmitted via a computer-readable non-tangible medium. If a receiver of the file has, or has access to, the necessary Huffman tables for decompressing the compressed dot-matrix font characters, then there is no need to include various Huffman tables in the file itself. On the other hand, if the receiver does not have access to the necessary Huffman tables, the file should include these Huffman tables. Likewise, if a receiver of the file does not have access to the necessary computer program for decompression, then the file should additionally include such computer program including computer-executable instructions for decompression.

While a method of compressing a set of dot-matrix font characters may be carried out fully automatically as described above, some human intervention may be allowed in some applications. For example, human intervention may be desired to adjust the threshold number of consecutive active dots to identify a horizontal or vertical stroke, as discussed above. Specifically, using the input device 2*b* and the output device 2*a* of the computer 1*a*, a user may experiment with selectively setting the threshold number of dots to identify a horizontal or vertical stroke, so as to prevent production of too many horizontal/vertical image patterns and/or too many residual image patterns. A user-interface software tool for this purpose may be included in the compressor module 93 in the memory 90.

Various embodiments described above can be combined or modified to provide further embodiments. These and other changes can be made to the embodiments in light of the above-detailed description. In general, in the following claims, the terms used should not be construed to limit the claims to the specific embodiments disclosed in the specification, but should be construed to include all possible embodiments along with the full scope of equivalents to which such claims are entitled. Accordingly, the claims are not limited by the disclosure.

The invention claimed is:

1. A computer-implemented method of compressing dot-matrix font data including a set of dot-matrix font characters, each character being represented in a dot-matrix, the method comprising:
   (a) dividing each dot-matrix font character into a horizontal image including horizontal image pattern(s), a vertical image including vertical image pattern(s), and a residual image including residual image pattern(s);

(b) applying the Huffman coding to the horizontal image patterns in the set to produce compressed horizontal codes for the horizontal image patterns in the set;

(c) applying the Huffman coding to the vertical image patterns in the set to produce compressed vertical codes for the vertical image patterns in the set;

(d) applying the Huffman coding to the residual image patterns in the set to produce compressed residual codes for the residual image patterns in the set; and (e) for each character, selectively combining the compressed horizontal codes, the compressed vertical codes, and the compressed residual codes to produce a bit string that represents a compressed form of the character.

2. The method of claim 1, wherein step (e) of selectively combining the compressed horizontal codes, the compressed vertical codes, and the compressed residual codes to produce a bit string comprises:

for the horizontal image pattern(s) in a dot-matrix font character, forming a vertical position code that identifies the vertical position(s) of the horizontal image pattern(s) in the dot-matrix, and combining the vertical position code with the compressed horizontal code(s) for the horizontal image pattern(s) in the character;

for the vertical image pattern(s) in the dot-matrix font character, forming a horizontal position code that identifies the horizontal position(s) of the vertical image pattern(s) in the dot-matrix, and combining the horizontal position code with the compressed vertical code(s) for the vertical image pattern(s) in the character; and for the residual image pattern(s) in the dot-matrix font character, forming a table ID code that identifies a residual Huffman table that defines the compressed residual code(s) for the residual image pattern(s) in the character, and combining the table ID code with the compressed residual code(s) for the residual image pattern(s).

3. The method of claim 1, wherein step (d) of applying the Huffman coding to the residual image patterns in the set comprises:

(I) sorting the residual image patterns in the set into multiple groups, while keeping the residual image pattern(s) that form one residual image of a dot-matrix font character in the same group, each of the multiple groups including a similar number of the residual image patterns within; and (II) applying the Huffman coding to each group of the residual image patterns to produce compressed residual codes for the group, to thereby form multiple residual Huffman tables that define the compressed residual codes for the multiple groups, respectively.

4. The method of claim 3, wherein step (d)(I) of sorting the residual image patterns in the set into multiple groups comprises:

(i) representing the residual image pattern(s) that form one residual image of a dot-matrix font character by a code word, to form plural code words that represent plural residual images, respectively; and (ii) sorting the residual image patterns in the set into multiple groups based on the code words.

5. The method of claim 4, wherein step (d)(I)(i) of representing the residual image pattern(s) that form one residual image of a dot-matrix font character by a code word comprises:

selecting a number of dot locations in the dot-matrix;
for the residual image pattern(s) that form one residual image of a dot-matrix font character, forming a dot-location bit sequence indicative of which of the selected dot locations in the dot-matrix is/are occupied by the residual image; and generating a code word based on the dot-location bit sequence.

6. The method of claim 4, wherein step (d)(I)(ii) of sorting the residual image patterns in the set into multiple groups based on the code words comprises:

forming a histogram with a first axis indicating the code words and a second axis indicating the number of residual image patterns per each code word; and performing quantization on the histogram to distribute the residual image patterns into multiple groups of equal size.

7. The method of claim 3, wherein the number of the residual image patterns included in each of the multiple groups is the same.

8. The method of claim 3, wherein the number of the residual image patterns included in each of the multiple groups is less than one hundred.

9. The method of claim 3, wherein the number of multiple groups into which the residual image patterns are sorted is $2^n$ where n is a positive integer.

10. The method of claim 3, wherein step (e) of selectively combining the compressed horizontal codes, the compressed vertical codes, and the compressed residual codes to produce a bit string that represents a compressed form of the character comprises:

for the horizontal image pattern(s) in the character, forming a vertical position code that identifies the vertical position(s) of the horizontal image pattern(s) in the dot-matrix, and combining the vertical position code with the compressed horizontal code(s) for the horizontal image pattern(s) in the character;

for the vertical image pattern(s) in the character, forming a horizontal position code that identifies the horizontal position(s) of the vertical image pattern(s) in the dot-matrix, and combining the horizontal position code with the compressed vertical code(s) for the vertical image pattern(s) in the character; and for the residual image pattern(s) in the character, selecting a table ID code that identifies which of the multiple residual Huffman tables defines the compressed residual code(s) for the residual image pattern(s) in the character, and combining the selected table ID code with the compressed residual code(s) for the residual image pattern(s).

11. A system for compressing/decompressing dot-matrix font data including a set of dot-matrix font characters, the system comprising:

a memory device configured to receive a set of compressed dot-matrix font characters to be decompressed;

a processor coupled to the memory and configured, for each of the compressed dot-matrix font characters, to:

(a) restore horizontal image pattern(s) based on determination of vertical position(s) of the horizontal image pattern(s) and in reference to a horizontal Huffman table;

(b) restore vertical image pattern(s) based on determination of horizontal position(s) of the vertical image pattern(s) and in reference to a vertical Huffman table;

(c) restore residual image pattern(s) based on determination of a residual Huffman table that defines the residual image pattern(s) and in reference to the determined residual Huffman table; and (d) combine the restored horizontal, vertical, and residual image patterns.

12. The system of claim 11, wherein the memory device is further configured to receive a set of non-compressed dot-matrix font characters to be compressed, and the processor is further configured, for each of the non-compressed dot-matrix font characters, to:
- (e) divide each non-compressed dot-matrix font character into a horizontal image including horizontal image pattern(s), a vertical image including vertical image pattern(s), and a residual image including residual image pattern(s);
- (f) apply the Huffman coding to the horizontal image patterns to produce compressed horizontal codes for the horizontal image patterns in the set;
- (g) apply the Huffman coding to the vertical image patterns to produce compressed vertical codes for the vertical image patterns in the set;
- (h) apply the Huffman coding to the residual image patterns to produce compressed residual codes for the residual image patterns in the set; and
- (i) for each character, selectively combine the compressed horizontal codes, the compressed vertical codes, and the compressed residual codes to produce a bit string that represents a compressed form of the character.

13. A computer-readable tangible medium containing computer-executable instructions which, when loaded onto a computer, cause the computer to perform the following steps to decompress compressed dot-matrix font data including a set of compressed dot-matrix font characters, the steps comprising:
- (a) receiving a set of compressed dot-matrix font characters;
- (b) retrieving a horizontal Huffman table, a vertical Huffman table, and one or more residual Huffman table(s);
- (c) searching the retrieved horizontal, vertical, and residual Huffman tables to obtain horizontal image pattern(s), vertical image pattern(s), and residual image pattern(s) for each character; and
- (d) combining the obtained horizontal image pattern(s), vertical image pattern(s), and residual image pattern(s) for each character to restore the original character.

14. The medium of claim 13, wherein step (b) of retrieving a horizontal Huffman table, a vertical Huffman table, and one or more residual Huffman table(s) comprises receiving these Huffman tables from another device exterior to the computer.

15. The medium of claim 13, wherein step (b) of retrieving a horizontal Huffman table, a vertical Huffman table, and one or more residual Huffman table(s) comprises retrieving these Huffman tables that are stored in a memory device within the computer.

16. The medium of claim 13, wherein step (a) of receiving a set of compressed dot-matrix font characters comprises receiving the set, wherein each of the compressed dot-matrix font characters is represented by a bit string, the bit string including:
- a vertical position code that identifies the vertical position(s) of the horizontal image pattern(s) in a dot-matrix font character;
- compressed horizontal code(s) for the horizontal image pattern(s) in the dot-matrix font character;
- a horizontal position code that identifies the horizontal position(s) of the vertical image pattern(s) in the dot-matrix font character;
- compressed vertical code(s) for the vertical image pattern(s) in the dot-matrix font character;
- a table ID code that identifies a residual Huffman table that defines the compressed residual code(s) for the residual image pattern(s) in the dot-matrix font character; and
- compressed residual code(s) for the residual image pattern(s) in the dot-matrix font character;

wherein step (b) further comprises retrieving the residual Huffman table that is identified by the table ID code; and wherein step (d) comprises combining the obtained horizontal image pattern(s) at the vertical position(s) identified by the vertical position code, the obtained vertical image pattern(s) at the horizontal position(s) identified by the horizontal position code, and the obtained residual image pattern(s) included in the residual Huffman table identified by the table ID code, for each character to restore the original character.

17. A computer-readable tangible medium containing computer-executable instructions which, when loaded onto a computer, cause the computer to decompress compressed dot-matrix font data, the computer-executable instructions comprising:
- a set of compressed dot-matrix font characters, each of the compressed dot-matrix font characters being represented by a bit string, the bit string including:
  - a vertical position code that identifies the vertical position(s) of the horizontal image pattern(s) in a dot-matrix font character;
  - compressed horizontal code(s) for the horizontal image pattern(s) in the dot-matrix font character;
  - a horizontal position code that identifies the horizontal position(s) of the vertical image pattern(s) in the dot-matrix font character;
  - compressed vertical code(s) for the vertical image pattern(s) in the dot-matrix font character;
  - a table ID code that identifies a residual Huffman table that defines the compressed residual code(s) for the residual image pattern(s) in the dot-matrix font character; and
  - compressed residual code(s) for the residual image pattern(s) in the dot-matrix font character.

18. The medium of claim 17, wherein the computer-executable instructions further comprise:
- a horizontal Huffman table that defines compressed horizontal codes for the horizontal image patterns in the set;
- a vertical Huffman table that defines compressed vertical codes for the vertical image patterns in the set; and
- a residual Huffman table that defines compressed residual codes for the residual image patterns in the set.

19. The medium of claim 18, wherein the computer-executable instructions further comprise multiple residual Huffman tables that define compressed residual codes for the residual image patterns that are sorted into multiple groups, respectively.

20. The medium of claim 17, wherein the computer-executable instructions further comprise decompression instructions.

* * * * *